US012215773B2

(12) United States Patent
Riedisser et al.

(10) Patent No.: US 12,215,773 B2
(45) Date of Patent: Feb. 4, 2025

(54) AUTOMATIC TRANSMISSION FOR A MOTOR VEHICLE

(71) Applicant: ZF Friedrichshafen AG, Friedrichshafen (DE)

(72) Inventors: Thomas Riedisser, Sigmarszell (DE); Gabriele Glade, Friedrichshafen (DE); Julia Baumann, Bodnegg (DE); Stephan Stroph, Tettnang (DE); Andreas Knörle-Philipp, Ravensburg (DE); Jan Göbel, Wasserburg (DE); Peter Reinders, Markdorf (DE); Martin Kibler, Friedrichshafen (DE); Hans-Peter Bock, Bermatingen-Ahausen (DE); Florian Lanz, Tettnang (DE); Juergen Stauber, Kressbronn (DE); Rudolf Raedler, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/312,756

(22) Filed: May 5, 2023

(65) Prior Publication Data
US 2023/0358301 A1    Nov. 9, 2023

(30) Foreign Application Priority Data
May 6, 2022    (DE) ..................... 10 2022 204 500.9

(51) Int. Cl.
*F16H 57/04*    (2010.01)
*F16H 41/30*    (2006.01)

(52) U.S. Cl.
CPC ......... *F16H 57/0423* (2013.01); *F16H 41/30* (2013.01)

(58) Field of Classification Search
CPC .............. F16H 57/0423; F16H 57/042; F16H 57/0421; F16H 47/08; F16H 57/0473
See application file for complete search history.

(56) References Cited

U.S. PATENT DOCUMENTS

| 9,878,706 B2 | 1/2018 | Frait et al. |
| 10,208,850 B1 * | 2/2019 | Patel ...................... F16H 57/02 |

(Continued)

FOREIGN PATENT DOCUMENTS

| DE | 102014118485 A1 | 6/2015 |
| DE | 102017209979 A1 | 12/2018 |

(Continued)

OTHER PUBLICATIONS

German Search Report DE 10 2022 204 500.9, dated Nov. 28, 2022. (10 pages).

*Primary Examiner* — Huan Le
*Assistant Examiner* — Aimee Tran Nguyen
(74) *Attorney, Agent, or Firm* — Dorty & Manning, P.A.

(57) ABSTRACT

An automatic transmission (1) includes a transmission housing, a hydrodynamic torque converter (5), a first brake, a second brake, an intermediate plate (6) fixedly connected to the transmission housing and with ducts for supplying the hydrodynamic torque converter (5) and the two brakes (A, B) with oil. An oil guide shell (7) is arranged between the hydrodynamic torque converter (5) and the intermediate plate (6). Oil coming from the two brakes sinks via oil ducts (39.1, 39.2, 39.3) in the transmission housing and the intermediate plate (6) via the inflow opening (40) in the oil guide shell (7). The hydrodynamic torque converter (5), via rotation, conveys the oil to the elevated oil ejection opening in the oil guide shell (7), from where the oil sinks into the tank (8) via a gap (52) delimited by the oil guide shell (7) and the intermediate plate (6).

11 Claims, 16 Drawing Sheets

(56) References Cited

U.S. PATENT DOCUMENTS

| | | | |
|---|---|---|---|
| 10,385,960 B2 | 8/2019 | Zhang et al. | |
| 11,548,367 B2 | 1/2023 | Gyarmati et al. | |
| 2009/0165586 A1* | 7/2009 | Ariga | F16H 57/0423 |
| | | | 74/467 |
| 2017/0023130 A1* | 1/2017 | Uesugi | F16H 57/02 |
| 2018/0106357 A1* | 4/2018 | Kawakami | F16H 57/0423 |

FOREIGN PATENT DOCUMENTS

| | | |
|---|---|---|
| DE | 102018119186 A1 | 2/2019 |
| DE | 102020203984 A1 | 11/2020 |
| DE | 102019212670 A1 | 2/2021 |
| DE | 102020203948 A1 | 9/2021 |

* cited by examiner

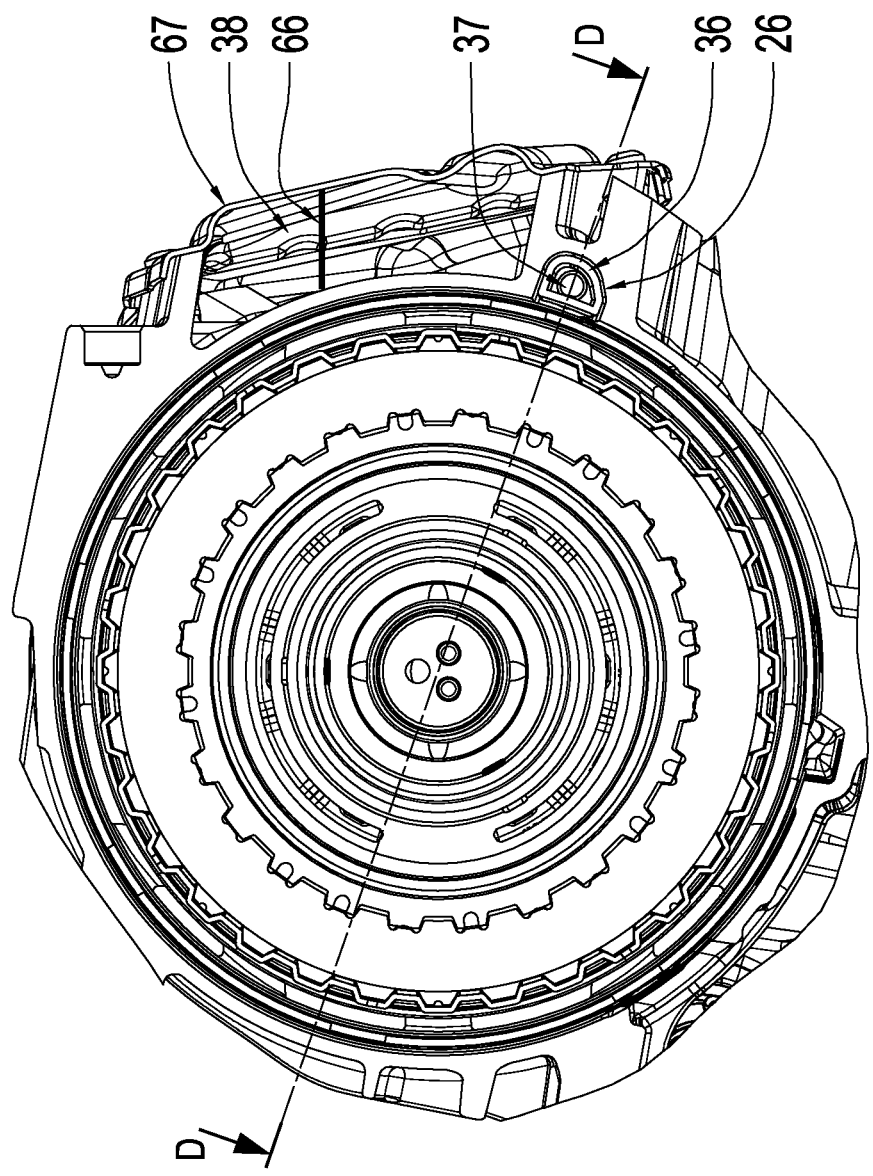
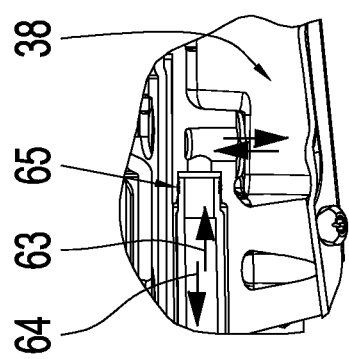
Fig. 14
Fig. 15

AUTOMATIC TRANSMISSION FOR A MOTOR VEHICLE

CROSS-REFERENCE TO RELATED APPLICATION

The present application is related and has right of priority to German Patent Application No. DE102022204500.9 filed on May 6, 2022, which is incorporated by reference in its entirety for all purposes.

FIELD OF THE INVENTION

The invention relates generally to an automatic transmission for a motor vehicle.

BACKGROUND

Automatic transmissions are known, in which a hydrodynamic torque converter having a rotor of an electric motor connected directly on the input side is installed in a hybrid space through which oil flows, the hybrid space being separated from an oil sump area in the lower area of the automatic transmission via a half-shelled torque converter oil guide shell. An outer shell of the hydrodynamic torque converter and the rotor of the electric motor rotate directly in oil of the transmission and sling the oil that is flowing into the hybrid space, via an area of the half-shelled oil guide shell that is open at the top, in the direction of a centering plate of the intermediate plate for supplying oil. From the centering plate of the intermediate plate, the oil can then flow downward due to the force of gravity within a gap between the oil guide shell and the intermediate plate back into the oil sump. An oil level within the hybrid space can rise into this gap to a greater or lesser extent depending on the oil quantity tolerance, the driving mode (acceleration or deceleration, inclination), the oil sump temperature, and the volume expansion due to the proportion of air in the oil. If the oil sump temperature increases, the oil expands due to volume expansion and the oil level rises further in the direction of a transmission central axis and, possibly, even past the transmission central axis.

DE 10 2020 203 948 A1 makes known a transmission for operation with oil, the transmission having a central part space in which moving transmission parts are located and into which oil can be released. The transmission includes a receiving space in which this oil can collect as an oil sump, and a compensating cavity, which can receive excess oil escaping from the receiving space, the compensating cavity being permanently connected through to the receiving space for the oil, this connection being arranged such that excess oil can flow independently from the compensating cavity back into the receiving space. It is also known to provide two brakes of the automatic transmission as frictional shift elements of a disk design, which are preferably de-oiled directly downward into the oil sump area via openings or ducting in the transmission housing and/or in the intermediate plate.

SUMMARY OF THE INVENTION

Example aspects of the present invention provide an alternative de-oiling of two brakes, wherein reproducible and low drag torques in the frictional shift elements of a disk design are ensured regardless of a rising oil level. This is intended to be the case as far as possible regardless of the temperature, the proportion of air, the oil quantity tolerance, driving modes (dynamics, travel uphill and downhill), the gear selection, and the transmission speed.

According to example aspects of the present invention, it is provided to carry out the de-oiling of two brakes of an automatic transmission in a targeted manner via appropriate ducting within the transmission housing, the intermediate plate (oil supply system), and the torque converter oil collecting tray in the direction of the hydrodynamic torque converter. Having arrived at the hydrodynamic torque converter, the cooling oil draining from the two brakes is then to be forced, due to the rotation of the hydrodynamic torque converter, which always takes place in the same direction of rotation, along an inner diameter of the torque converter oil guide shell, which is formed at a close distance to the hydrodynamic torque converter, to an oil ejector at the oil guide shell and discharged. Via this oil ejector at the oil guide shell, the oil enters the gap between the oil guide shell and the oil supply system, from where the oil can then flow back into the oil sump of the oil pan in a targeted manner due to the force of gravity. As a result, it is ensured that the de-oiling of the two brakes always takes place such that a near independence from the rising oil level prevails, as a result of which the drag torque of the two brakes is at a reproducibly low level and, in fact, more particularly regardless of the temperature, the air proportion, the oil quantity tolerance, driving modes (dynamics, travel uphill and downhill), the gear selection, and the transmission speed.

In this sense, an automatic transmission for a motor vehicle is provided according to example aspects of the present invention. The automatic transmission has a transmission housing, a hydrodynamic torque converter, a first shift element in the form of a first brake, and a second shift element in the form of a second brake. In addition, the automatic transmission has an intermediate plate, which is fixedly connected to the transmission housing and has ducts for supplying the hydrodynamic torque converter and the two brakes with oil, and an oil guide shell, which is arranged between the hydrodynamic torque converter and the intermediate plate, and a tank. The tank can be, more particularly, an oil pan of an automatic transmission. The oil sump can be stored in the tank. The oil guide shell has an inflow opening arranged above the tank and an oil ejection opening arranged above the inflow opening. Oil coming from the two brakes sinks via oil ducts in the transmission housing and the intermediate plate and arrives at the hydrodynamic torque converter via the inflow opening in the oil guide shell. The hydrodynamic torque converter, due to rotation, conveys the oil to the elevated oil ejection opening in the oil guide shell, from where the oil sinks into the tank via a gap delimited by the oil guide shell and the intermediate plate.

The automatic transmission has, more particularly, an input side and an output side. On the input side, an input shaft of the automatic transmission is connected more particularly to a rotating shaft of a prime mover of a drive train of a motor vehicle, more particularly to a rotor shaft of an electric motor. An output shaft of the automatic transmission, more particularly, is located on the output side. Relative to these two sides of the automatic transmission, the oil guide shell is arranged more particularly further on the output side than the hydrodynamic torque converter. In other words, the hydrodynamic torque converter is arranged further on the input side than the oil guide shell. The intermediate plate is arranged further on the output side than the oil guide shell and the hydrodynamic torque converter. The oil guide shell is arranged at a close distance to the hydrodynamic torque converter on the output side. The oil guide shell is, more particularly, a full shell, i.e., a shell that is closed three hundred and sixty degrees (360°) all-round and is not a half shell. Therefore, the oil guide shell is three hundred and sixty degrees (360°) mall-round and not, for example, only approximately one hundred and eighty degrees (180°) (half shell). The oil guide shell can be made, for example, of plastic in an injection molding process.

The inflow opening is preferably arranged in a lower area of the automatic transmission, whereas the oil ejection opening is preferably arranged in an upper area of the automatic transmission. As viewed from a prime mover (internal combustion engine and/or electric motor) arranged on the input side of the automatic transmission, the oil guide shell has the inflow opening of the brake de-oiling at approximately five (5) o'clock and, in fact, at an outer edge of the oil guide shell. The oil ejection opening in the oil guide shell, however, is arranged at approximately one (1) o'clock and, in fact, also at an outer edge of the oil guide shell. A longitudinal axis of the input shaft of the automatic transmission would extend through a center of a face of an imaginary clock. An inner end of an hour hand of the clock would be rotatably secured in the center of the clock face such that an outer end of the hour hand indicates the hour. As an alternative to this time-of-day representation, if it is established that a longitudinal axis of an input shaft of the automatic transmission extends in a horizontal plane, a vertical axis can be defined that extends perpendicularly to the aforementioned horizontal plane and intersects the longitudinal axis of the input shaft at a point of origin. A first line, which begins in the point of origin and ends at the oil ejection opening, forms an angle with the vertical axis that is in the range of approximately thirty degrees (30°). If this first line is compared to an hour hand of a clock, this hour hand would point to approximately one (1) o'clock. The end point of the first line is situated in the oil ejection opening and the hour hand points with the end at the oil ejection opening. Similarly, a second line, which begins in the point of origin and ends at the inflow opening of the brake de-oiling, can enclose an angle with the vertical axis that is in the range of one hundred and fifty degrees (150°). If this second line is compared to an hour hand of a clock, this hour hand would point to approximately five (5) o'clock. The end point of the second line is situated in the inflow opening of the brake de-oiling and the hour hand points with the end at the inflow opening of the brake de-oiling.

The oil guide shell rests against an inner area of a hybrid bellhousing of the transmission housing, more particularly as gaplessly as possible and preferably elastomer sealed in the lower area, as a result of which a sufficient oil tightness against penetration by the oil level from the oil sump area to the torque converter area is achieved. In this sense, it is provided according to one example embodiment that the oil guide shell rests gaplessly against an inner area of the transmission housing in a lower area of the automatic transmission such that the oil guide shell seals the hydrodynamic torque converter with respect to oil from the tank. The combination of the oil ejection opening at the upper position of the oil guide shell and the seal to the tank at the lower position makes it possible to convey the oil out of the torque converter area to the tank due to the rotation of the torque converter, as a result of which the torque converter can preferably operate in an oil/air mixture and, in fact, with reduced drag torques as compared to running directly in the oil sump level. Due to this specific design, the hydrodynamic torque converter functions practically as a feed pump.

A more particularly consolidated amount of cooling oil of the two brakes can be carried along by the rotating hydrodynamic torque converter when exiting the inflow opening in the oil guide shell and, more particularly, forced along an inner diameter of the oil guide shell in the torque converter rotation direction. At approximately one (1) o'clock, the oil can then be conveyed via a radially outward rising drainage ramp to the oil ejection opening in the oil guide shell, from where the oil is deflected in an axial direction due to the shape of the oil ejection opening, which is more particularly curved in the direction of the output side, and guided into the gap between the oil guide shell and the oil supply system. In this sense, it is provided according to one example embodiment that the oil guide shell has a drainage ramp in the area of the oil ejection opening, the discharge ramp rising outward in a radial direction up to the oil ejection opening. The discharge ramp is curved in the direction of the output side such that oil conveyed from the hydrodynamic torque converter in the direction of the oil ejection opening is deflected via the discharge ramp to the oil ejection opening and, thereafter, into the gap between the oil guide shell and the intermediate plate.

Oil that was deflected into the gap via the discharge ramp and the oil ejection opening can be conveyed back in the direction of the oil sump in a targeted manner by oil guide webs, which can be mounted on the back side of the oil guide shell facing away from the hydrodynamic torque converter. The oil guide webs can extend such that a flow-stabilized oil return flow area sets in within the gap. The oil can then return to the oil sump via an oil discharge opening in the transmission housing at approximately six (6) o'clock, the oil discharge opening being, for example, cast and punched. In this sense it is provided according to one example embodiment that the oil guide shell has multiple oil guide webs, which project from a surface of the oil guide shell, which faces the output side, in the direction of the output side of the automatic transmission, wherein the oil guide webs deflect oil that has entered the gap between the oil guide shell and the intermediate plate via the oil ejection opening in the direction of an oil ejection opening in the lower area of the automatic transmission such that the oil can drain into the tank via the oil discharge opening.

In the transmission housing, a cast oil drainage channel can be introduced at approximately four (4) o'clock at a cast driving spline for outer clutch disks of the second brake. This oil drainage channel has a flank, which is slanted in the main direction of rotation of the second brake, the flank being designed as an oil-scraping edge or as an oil-scraping plane. When the second brake is disengaged, oil that has cooled the second brake can flow radially outward via grooves in rotating lined disks of the second brake. A flow arises due to the rotation of the disengaged second brake. This amount of cooling oil is subsequently forced along the driving spline in the clockwise direction in the direction of rotation of the second brake via the flow until the oil reaches the introduced oil drainage channel at approximately four (4) o'clock (or one hundred and twenty degrees (120°) relative to the vertical axis), from where the oil is deflected via the oil-scraping edge and discharged. In this sense it is provided according to one example embodiment that the transmission housing forms a driving spline for the second brake, wherein the oil duct in the transmission housing includes an oil drainage channel having an oil-scraping edge, the oil drainage channel being arranged in the area of the driving spline for the second brake. Oil coming from the second brake is conveyed along the driving spline in a direction of rotation of the second brake when the second brake is disengaged and rotates, wherein oil conveyed from the disengaged second brake along the driving spline is deflected from the oil-scraping edge into the oil duct of the intermediate plate. The oil duct for the oil coming from the second brake is positioned in the transmission housing more particularly such that an upper end of the oil duct is always situated above a possible oil level and has a slant toward the inflow opening to the hydrodynamic torque converter.

Moreover, the oil discharge opening can be introduced into the cast gear teeth section of the second brake in the transmission housing at, preferably, six (6) o'clock relative to the above-described time-of-day representation. Via the oil discharge opening, the oil can be diverted directly into the oil sump of the oil pan in the lower area of the automatic transmission. As a result, it is ensured that all the oil coming from the second brake can drain into the oil sump when the vehicle is at a standstill, as a result of which the cold start behavior of the frictional shift element is improved. In this sense it is provided according to one example embodiment that the transmission housing forms an oil discharge opening, which is arranged underneath the oil drainage channel in the area of the driving spline for the second brake, wherein oil coming from the second brake can drain into the tank via the oil drainage channel. A through-flow area of the lower oil discharge opening for the second brake can be dimensioned such that an amount of oil flowing into the second brake due to an oil level rising from below is always less than the possible amount of oil draining via the oil drainage channel at approximately four (4) o'clock. More particularly, a flow cross-section of the oil discharge opening is smaller than a flow cross-section of the drainage channel. As a result, the second brake can free itself of oil by rotating in the disengaged condition, resulting in reduced drag torques. A through-flow area is understood to refer in the following to the cross-sectional area of a line or a duct at a certain point, preferably at the narrowest point, through which a liquid or gaseous medium flows.

The oil coming from the oil duct in the transmission housing, which has previously cooled the second brake, can flow to the inflow opening in the oil guide shell via the oil duct of the intermediate plate, the oil duct having been introduced, more particularly, via casting. On the way to the inflow opening, the oil from the second brake can merge with an oil flow that has previously cooled the first brake. For this purpose, the oil duct of the intermediate plate can include a first oil duct section for oil coming from the first brake and a second oil duct section for oil coming from the second brake. The first oil duct section and the second oil duct section can be combined at a consolidation point to form a third oil duct section, which finally leads to the inflow opening in the oil guide shell such that the consolidated oil coming from the two brakes can be fed to the rotating hydrodynamic torque converter. In this sense it is provided according to one example embodiment that the intermediate plate for oil coming from the first brake forms a first oil duct section. The intermediate plate also forms a second oil duct section for oil coming from the second brake, the second oil duct section being connected to the oil duct in the transmission housing. The first oil duct section and the second oil duct section are combined in a common third oil duct section, which is connected to the inflow opening in the oil guide shell. The oil duct sections for the oil that comes from the two brakes are designed, more particularly, such that a slant from top to bottom always prevails in the installed position of the transmission, as a result of which the brake de-oiling takes place due to a static height difference and amplified by the suction effect during the rotation of the torque converter.

The first oil duct section for oil from the first brake is preferably designed as an oblique bore in a lower area of the intermediate plate. This oblique bore extends, more particularly starting from a cast driving spline for outer clutch disks of the first brake, from the inside to the outside in the radial direction to the consolidation point with the second oil duct section of the intermediate plate for oil from the second brake. Thereafter, the consolidated amount of oil coming from the two brakes can jointly flow to the inflow opening in the oil guide shell via the third oil duct section of the intermediate plate. Due to this arrangement and the course of the first oil duct section, a drainage opening for oil from the first brake is created in the lower area of the automatic transmission, thereby preventing oil from remaining once the transmission comes to a standstill, i.e., the first brake can nearly completely de-oil in the inoperative condition, which improves the cold start behavior. In this sense it is provided according to one example embodiment that the first oil duct section is designed as an oblique bore in a lower area of the intermediate plate, wherein the oblique bore extends between a cast driving spline for outer clutch disks of the first brake and the third oil duct section and extends from the inside out in a radial direction.

The hydrodynamic torque converter can carry along the oil fed thereto via an inlet ramp of the oil guide shell oriented in the torque converter rotation direction and accelerate the oil radially outward in a direction of rotation of the hydrodynamic torque converter, as a result of which a pump effect arises due to the formation of a vacuum at the inflow opening. The inlet ramp at the inflow opening reduces the flow pressure losses during the deflection of the oil in the torque converter rotation direction and, therefore, increases the pump effect and the rate of oil drainage from the two brakes. In this sense it is provided according to one example embodiment that the oil guide shell has an inlet ramp. The inlet ramp is slanted in a direction of rotation of the hydrodynamic torque converter such that oil is drawn in from the inflow opening in the oil guide shell by the inlet ramp when the hydrodynamic torque converter is rotating. Thereafter, the hydrodynamic torque converter accelerates the drawn-in oil radially outward in the direction of rotation of the hydrodynamic torque converter and conveys the oil to the elevated oil ejection opening in the oil guide shell.

The oil drainage channel for oil from the second brake, which is positioned at approximately four (4) o'clock and designed, more particularly, as a cast duct, can be axially extended in the transmission housing in the direction of the output side. An oil tube made preferably of plastic can be introduced into the cast duct. Via the oil tube, an oil level compensating cavity can be automatically filled and also appropriately drained and, in fact, via an oil level rising in the gap between the oil guide shell and the intermediate plate. For this purpose, an oil level compensating cavity (also referred to as an oil bunker or a bunker) can be mounted on the outer side of the transmission housing more particularly at the level of the transmission central axis, within which oil level compensating cavity an oil volume can be temporarily stored. Due to this intermediate storage, a level of the oil sump can be automatically regulated and adapted according to the temperature, the air proportion, the oil quantity tolerance, driving modes (dynamics, travel uphill and downhill), the gear selection, and the transmission speed. Due to the intermediate storage in the oil level compensating cavity, it can be ensured that rotating parts of the automatic transmission do not become immersed in the oil level. In this sense it is provided according to one example embodiment that the automatic transmission has an oil level compensating cavity, which is arranged on the outer side of the transmission housing at the level of the transmission central axis. The drainage channel is designed as a cast duct in the transmission housing, the cast duct extending axially in the direction of the output side and up to the oil level compensating cavity. An oil tube is arranged in the cast duct, the oil tube connecting the oil level compensating cavity to the gap between the oil guide shell and the intermediate plate such that oil can flow from the gap into the oil level compensating cavity when an oil level within the gap reaches an input-side opening of the oil tube.

BRIEF DESCRIPTION OF THE DRAWINGS

Exemplary embodiments of the invention are explained in greater detail in the following with reference to the schematic drawing, identical or similar elements being labeled with the same reference character, wherein FIG. 14 shows a detail A of the automatic transmission from FIG. 13 in the area of the oil level compensating cavity, FIG. 15 shows a cross-sectional representation of the automatic transmission according to the sectional view Q5-Q5 in FIG. 13.

DETAILED DESCRIPTION

Figure 1:
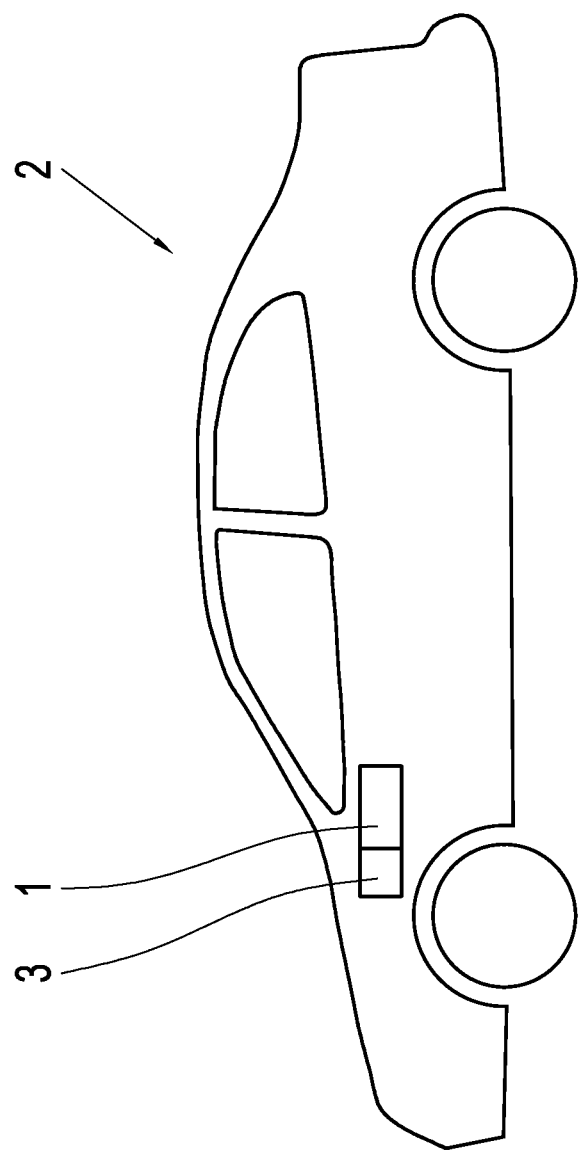
FIG. 1 shows a side view of a motor vehicle that includes an automatic transmission according to example aspects of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 schematically shows an automatic transmission 1, which is used in a motor vehicle 2. The motor vehicle 2 has at least one prime mover 3, which drives the motor vehicle 2 via the automatic transmission 1. The motor vehicle 2 shown can be, for example, a hybrid vehicle, which can be driven by an internal combustion engine and/or by an electric machine. Alternatively, however, only the internal combustion engine or the electric machine can be provided for driving the motor vehicle 2.

Figure 2:
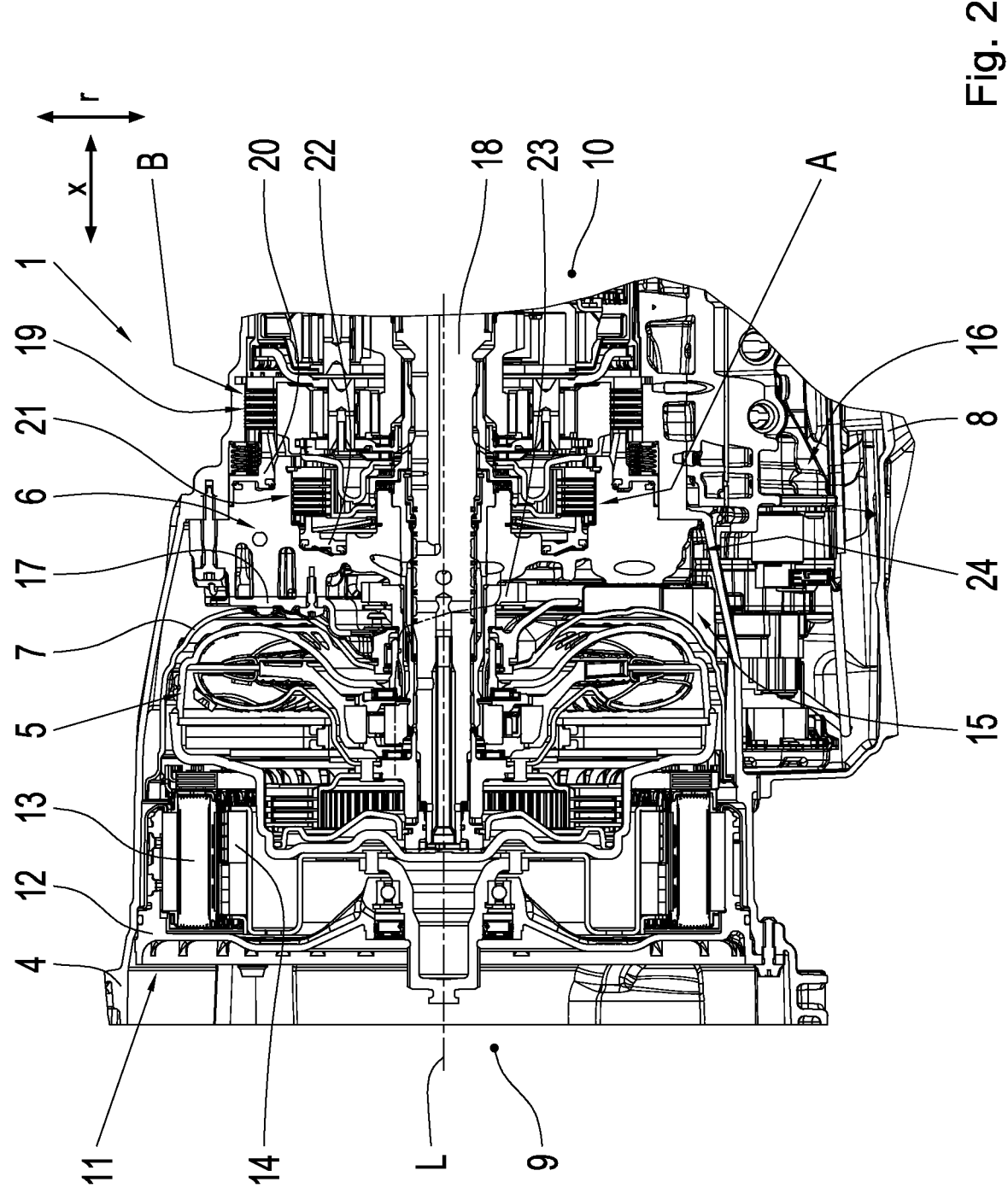
FIG. 2 shows a longitudinal sectional representation of a portion of an automatic transmission for the motor vehicle from FIG. 1 according to the sectional view A-A in FIG. 5.

FIG. 2 shows details of an exemplary embodiment of an automatic transmission 1 according to example aspects of the invention, which can be used in the motor vehicle from FIG. 1. The automatic transmission 1 includes a transmission housing 4, a hydrodynamic torque converter 5, a first shift element in the form of a first brake A and a second shift element in the form of a second brake B. In FIG. 2, the arrows labeled with the reference characters A, B each point to a disk pack of the two brakes A, B, respectively. The automatic transmission 1 also includes an intermediate plate 6, which is fixedly connected to the transmission housing 4 and has ducts for supplying the hydrodynamic torque converter 5 and the two brakes A, B with oil. Moreover, the automatic transmission 1 includes an oil guide shell 7, which is arranged between the hydrodynamic torque converter 5 and the intermediate plate 6, and a tank in the form of an oil pan 8. As is described in greater detail in the following, the oil guide shell 7 has an inflow opening 40 (for example, FIGS. 3, 8), which is arranged above the tank 8, and an oil ejection opening 50 (for example, FIGS. 7 through 9), which is arranged above the inflow opening 40. Oil coming from the two brakes A, B sinks via oil ducts in the transmission housing 4 and the intermediate plate 6 and reaches the hydrodynamic torque converter 5 via the inflow opening 40 in the oil guide shell 7. The hydrodynamic torque converter 5 conveys the oil via rotation to the elevated oil ejection opening 50 in the oil guide shell 7, from where the oil sinks into the tank 8 via a gap, which is delimited by the oil guide shell 7 and the intermediate plate 6.

The automatic transmission 1 has, more particularly, an input side 9 and an output side 10. An electric machine 11, which can be operated as a motor and as a generator, is arranged on the input side 9. The electric machine 11 has a stator carrier 12, a stator 13, and a rotor 14. The hydrodynamic torque converter 5 is, more particularly, permanently rotationally fixed to the rotor 14 of the electric machine 11. The hydrodynamic torque converter 5 is installed in a hybrid space 15, through which oil flows, together with the rotor 14 of the electric machine 11, the rotor 14 being directly connected to the hydrodynamic torque converter 5 on the input side. The hybrid space 15 is separated from an oil sump area 16, more particularly in a lower area of the automatic transmission 1, via the oil guide shell 7. An outer shell of the hydrodynamic torque converter 5 and the rotor 14 of the electric machine 11 rotate directly in oil of the automatic transmission 1. An oil level within the hybrid space 15 can rise within the hybrid space 15 between the oil guide shell 7 and the intermediate plate 6 to a greater or lesser extent depending on the oil quantity tolerance, the driving mode (acceleration or deceleration, inclination), the oil sump temperature, and the volume expansion due to the proportion of air in the oil. In the exemplary embodiment shown, a centering plate 17 is arranged between the intermediate plate 6 and the oil guide shell 7, the centering plate 17 being a part of the housing-affixed oil supply system. If the oil sump temperature increases, the oil expands due to volume expansion and the oil level rises further in the direction of a transmission central axis and, possibly, even past the transmission central axis. The transmission central axis can be, for example, the longitudinal axis L of an input shaft 18 of the automatic transmission 1.

FIG. 2 also shows that the transmission housing 4 forms an outer driving spline 19 for the second brake B, which has a piston 20. The intermediate plate 6 forms a driving spline 21 for the first brake A in a similar way, the first brake A also having a piston 22. The automatic transmission 1 also has a pump drive gear 23 and an oil discharge opening 24, which, formed by the transmission housing 4, is arranged between the hybrid space 15 and an interior space of the oil pan 8 and is described in greater detail below.

Figure 4:
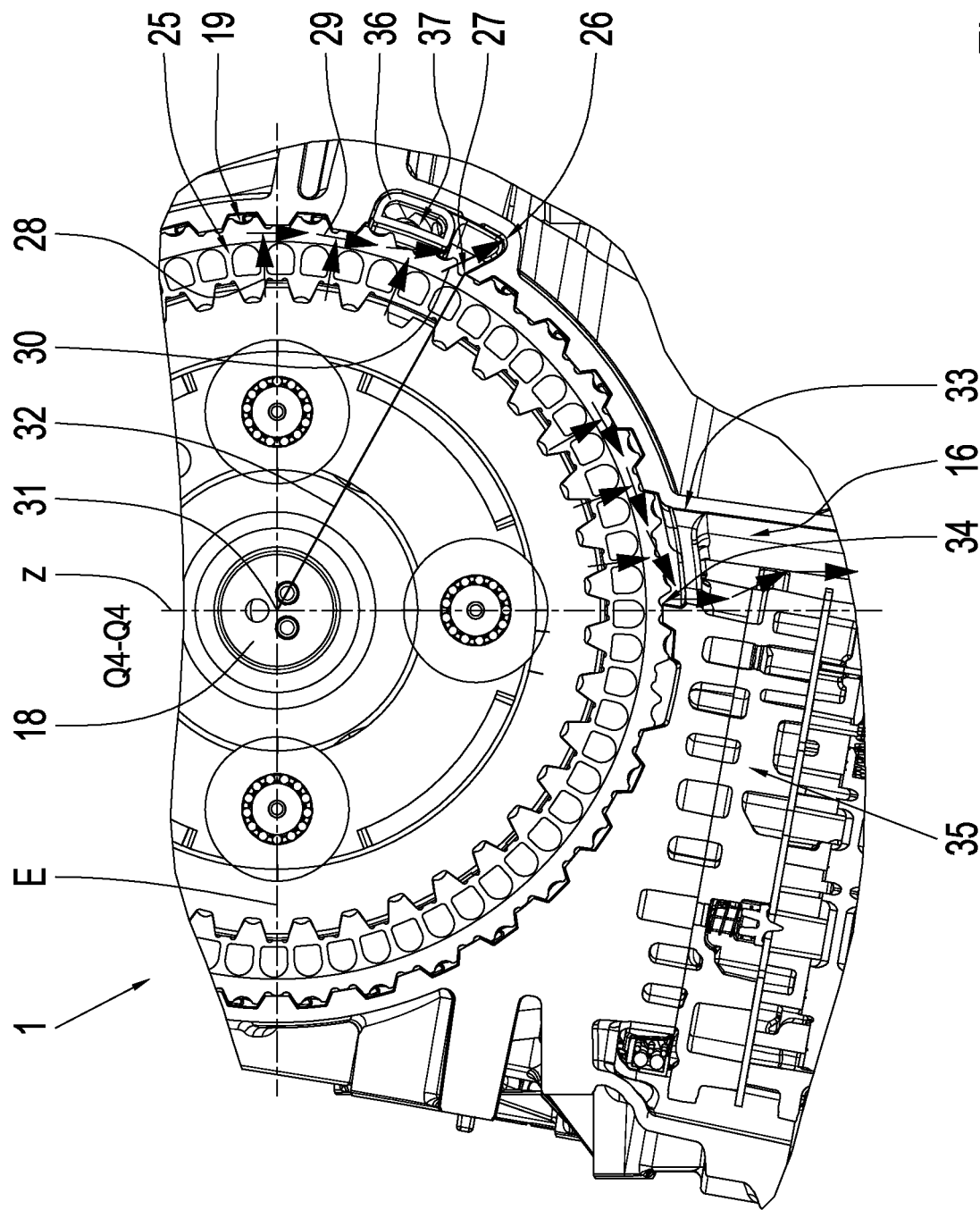
FIG. 4 shows a cross-sectional representation of a portion of the automatic transmission from FIG. 2 according to the sectional view Q4-Q4 in FIG. 3, wherein the de-oiling of the second brake in a transmission housing is illustrated.

FIG. 4 shows that a cast oil drainage channel 26 has been introduced at approximately four (4) o'clock at the cast driving spline 19 for outer clutch disks 25 (lined disks) of the second brake B, the oil drainage channel 26 forming the oil duct in the transmission housing 4.

The transmission housing 4 has the oil drainage channel 26 at approximately four (4) o'clock as viewed from the motor 11, which is arranged on the input side 9 of the automatic transmission 1. As an alternative to this time-of-day representation, if it is established that the longitudinal axis of the input shaft 18 of the automatic transmission 1 extends in a horizontal plane E, a vertical axis can be defined that extends perpendicularly to the aforementioned horizontal plane E and intersects the longitudinal axis of the input shaft 18 at a point of origin 31. A line 32, which begins in the point of origin 31 and ends at the oil drainage channel 26, forms an angle with the vertical axis z that is in the range of approximately one hundred and twenty degrees (120°). If this line 32 is compared to an hour hand of a clock, this hour hand would point to approximately four (4) o'clock. The end point of the line 32 is situated in the oil drainage channel 26 and the hour hand points with the end at the oil drainage channel 26.

The oil drainage channel 26 has a flank, which is slanted in a main direction of rotation (in the clockwise direction according to FIG. 4) of the second brake B, the flank being designed as an oil-scraping edge 27 or as an oil-scraping plane. When the second brake B is disengaged, oil that has cooled the second brake B can then flow radially outward via grooves in the rotating lined disks 25 of the disengaged second brake B, which is illustrated in FIG. 4 by radially outward oriented flow arrows, one flow arrow of which is labeled with the reference character 28. Due to the rotation of the disengaged second brake B, a flow arises in a main direction of rotation of the disengaged second brake B. This flow is illustrated in FIG. 4 by flow arrows oriented in the circumferential direction and in the clockwise direction, one flow arrow of which is labeled with the reference character 29. This amount of cooling oil is subsequently forced along the driving spline 19 in the clockwise direction via the flow in the direction of rotation of the second brake B until the oil reaches the introduced oil drainage channel 26 at approximately four (4) o'clock, from where the oil is deflected via the oil-scraping edge 27 and discharged, which is illustrated by a flow arrow 30 in FIG. 4. The oil duct 26 in the transmission housing 4, which is formed by the oil drainage channel, for the oil coming from the second brake B is positioned in the transmission housing 4 such that an upper end of the oil duct 26 is always situated above a possible oil level and has a slant toward an inflow opening (cf., for example, FIG. 3) to the hydrodynamic torque converter 5.

FIG. 4 also shows that an oil discharge opening 33 having an oil-scraping edge 34 has been introduced into the cast gear teeth section 19 of the second brake B in the transmission housing 4 at approximately six (6) o'clock relative to the above-described time-of-day representation. The oil discharge opening 33 is therefore arranged in the area of the driving spline 19 for the second brake B underneath the oil drainage channel 26. Via the oil discharge opening 33, the oil can be diverted directly into the oil sump area 16 of the oil pan 8 in the lower area of the automatic transmission 1. As a result, it is ensured that all the oil coming from the second brake B can drain into the tank 8 when the motor vehicle 1 is at a standstill, as a result of which the cold start behavior of the frictional shift element B is improved. A through-flow surface of the lower oil discharge opening 33 for the second brake B is dimensioned such that an amount of oil flowing into the second brake B due to an oil level rising from below is always less than the possible amount of oil draining via the oil drainage channel 26 at approximately four (4) o'clock. As a result, the second brake B can free itself of oil by rotating in the disengaged condition, resulting in reduced drag torques. FIG. 4 also shows that a hydraulic control unit 35 is arranged in an area of the oil pan 8. FIG. 4 also shows that an oil tube 36 is inserted into the oil drainage channel 26, the oil tube 36 forming an oiling and de-oiling duct 37 to an oil level compensating cavity 38, which is described in greater further detail below.

Figure 3:
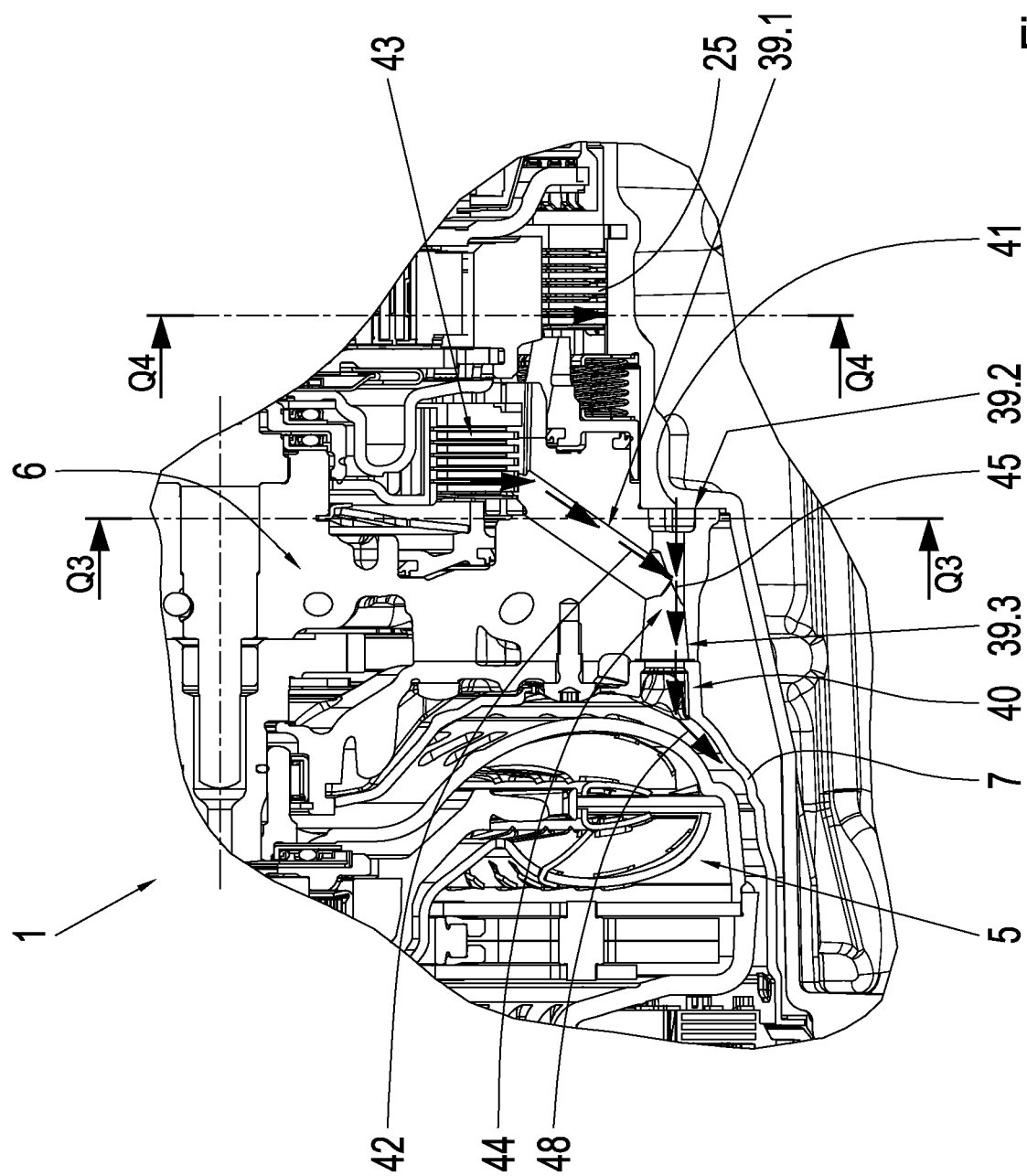
FIG. 3 shows a longitudinal sectional representation of a portion of the automatic transmission from FIG. 2 according to the sectional view B-B in FIG. 5, wherein a de-oiling from a first brake and a second brake in the direction of a hydrodynamic torque converter is illustrated.
Figure 5:
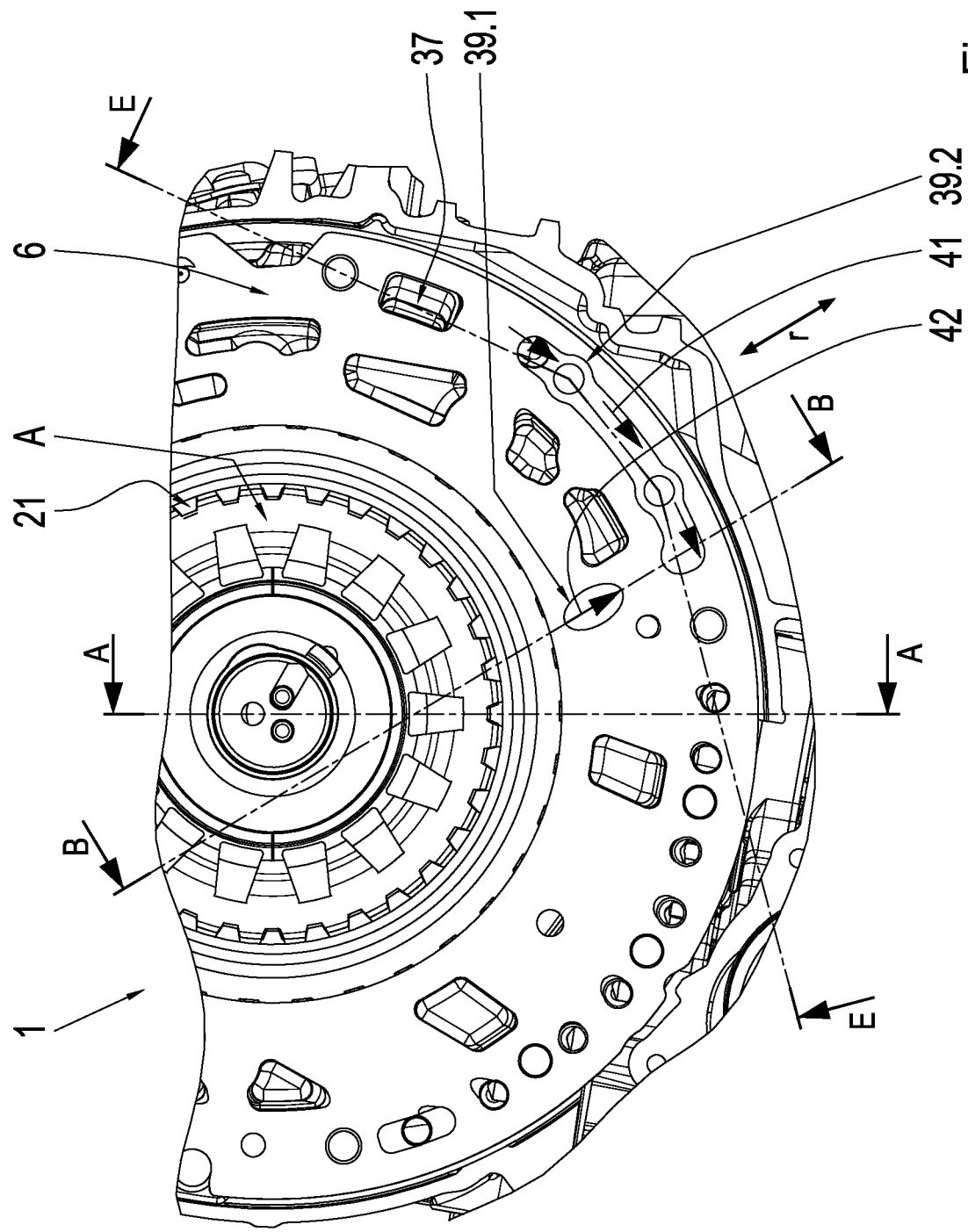
FIG. 5 shows a cross-sectional representation of a portion of the automatic transmission from FIG. 2 according to the sectional view Q3-Q3 in FIG. 3, wherein the de-oiling from the first brake and the second brake to the hydrodynamic torque converter is illustrated.
Figure 6:
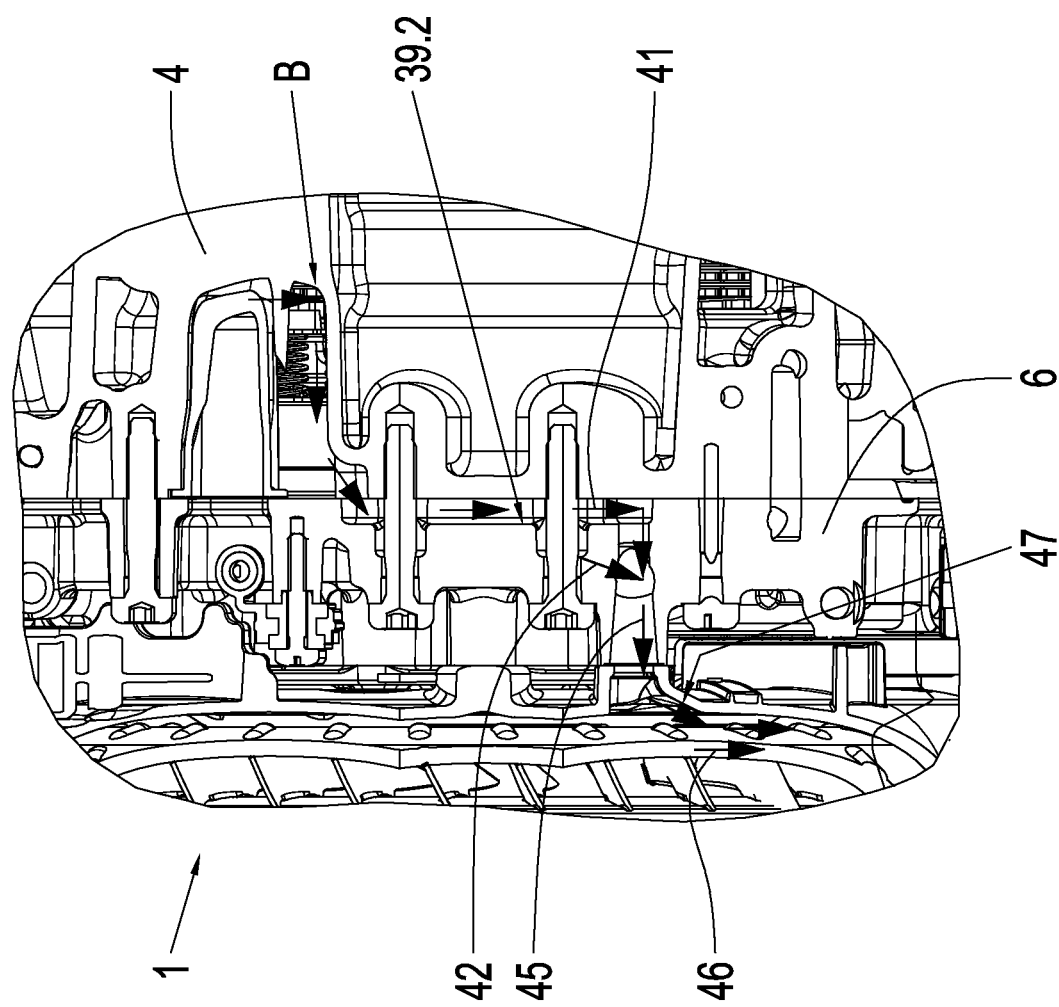
FIG. 6 shows a longitudinal sectional representation of a portion of the automatic transmission from FIG. 2 according to the sectional view E-E in FIG. 5, wherein the de-oiling from the first brake and the second brake to the hydrodynamic torque converter is illustrated.

FIGS. 3, 5 and 6 show that the intermediate plate 6 for oil coming from the first brake A forms a first oil duct section 39.1. The intermediate plate 6 also forms a second oil duct section 39.2 for oil coming from the second brake B, the second oil duct section 39.2 being connected to the oil duct 26 in the transmission housing 4 such that oil can flow out of the second brake B into the second oil duct section 39.2 via the oil duct 26. The first oil duct section 39.1 and the second oil duct section 39.2 are combined in a common third oil duct section 39.3, which is connected to the inflow opening 40 in the oil guide shell 7.

A second oil flow 41, which comes from the oil duct 26 in the transmission housing 4 and has previously cooled the second brake B, flows in the direction of the inflow opening 40 in the oil guide shell 7 via the second oil duct section 39.2 of the intermediate plate 6, the second oil duct section 39.2 having been introduced via casting. The second oil flow is illustrated by flow arrows 41. On the way to the inflow opening 40, the second oil flow 41 from the second brake B merges with a first oil flow 42, which has previously cooled the first brake A, in particular the disk pack 43 of the first brake A. The first oil flow 42 flows in the direction of the inflow opening 40 via the first oil duct section 39.1 of the intermediate plate 6, which has been introduced via machining, for example, by drilling or milling, or via casting. The first oil duct section 39.1 and the second oil duct section 39.2 are combined at a consolidation point 44 or in a consolidation area to form the third oil duct section 39.3, which finally leads to the inflow opening 40 in the oil guide shell 7 such that a consolidated third oil flow 45 coming from the two brakes A, B can be fed to the rotating hydrodynamic torque converter 5 via the inflow opening 40.

The first oil duct section for oil from the first brake A is designed as an oblique bore 39.1 in a lower area of the intermediate plate 6 in the exemplary embodiment shown. This oblique bore 39.1 extends, starting from a cast driving spline 21 for the outer clutch disks 43 of the first brake A, from the inside to the outside in the radial direction r to the consolidation point 44 with the second oil duct section 39.2 of the intermediate plate 6 for oil from the second brake B. Thereafter, the consolidated amount of oil 45 coming from the two brakes A, B jointly flows to the inflow opening 40 in the oil guide shell 7 via the third oil duct section 39.3 of the intermediate plate 6. Due to this arrangement and the course of the first oil duct section 39.1, a drainage opening for oil from the first brake A is created in the lower area of the automatic transmission 1, thereby preventing oil from remaining once the transmission comes to a standstill, i.e., the first brake A can nearly completely de-oil in the inoperative condition, which improves the cold start behavior. The oil duct sections 39.1, 39.2, 39.3 for the oil that comes from the two brakes A, B are designed such that a slant from top to bottom always prevails in the installed position of the transmission, as a result of which the brake de-oiling takes place due to a static height difference and amplified by the suction effect during the rotation of the torque converter.

Figure 7:
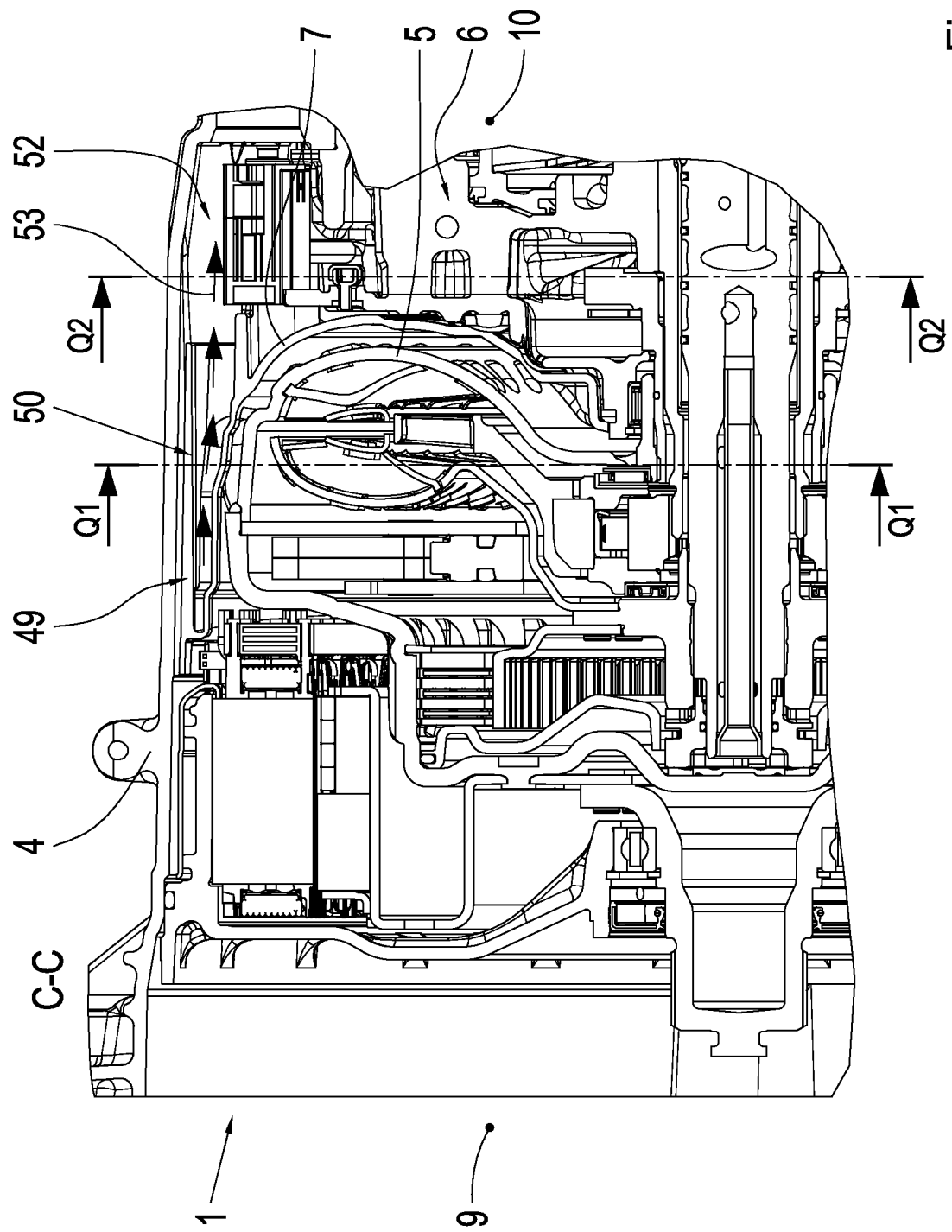
FIG. 7 shows a longitudinal sectional representation of a portion of the automatic transmission from FIG. 2 according to the sectional view C-C in FIG. 9.
Figure 8:
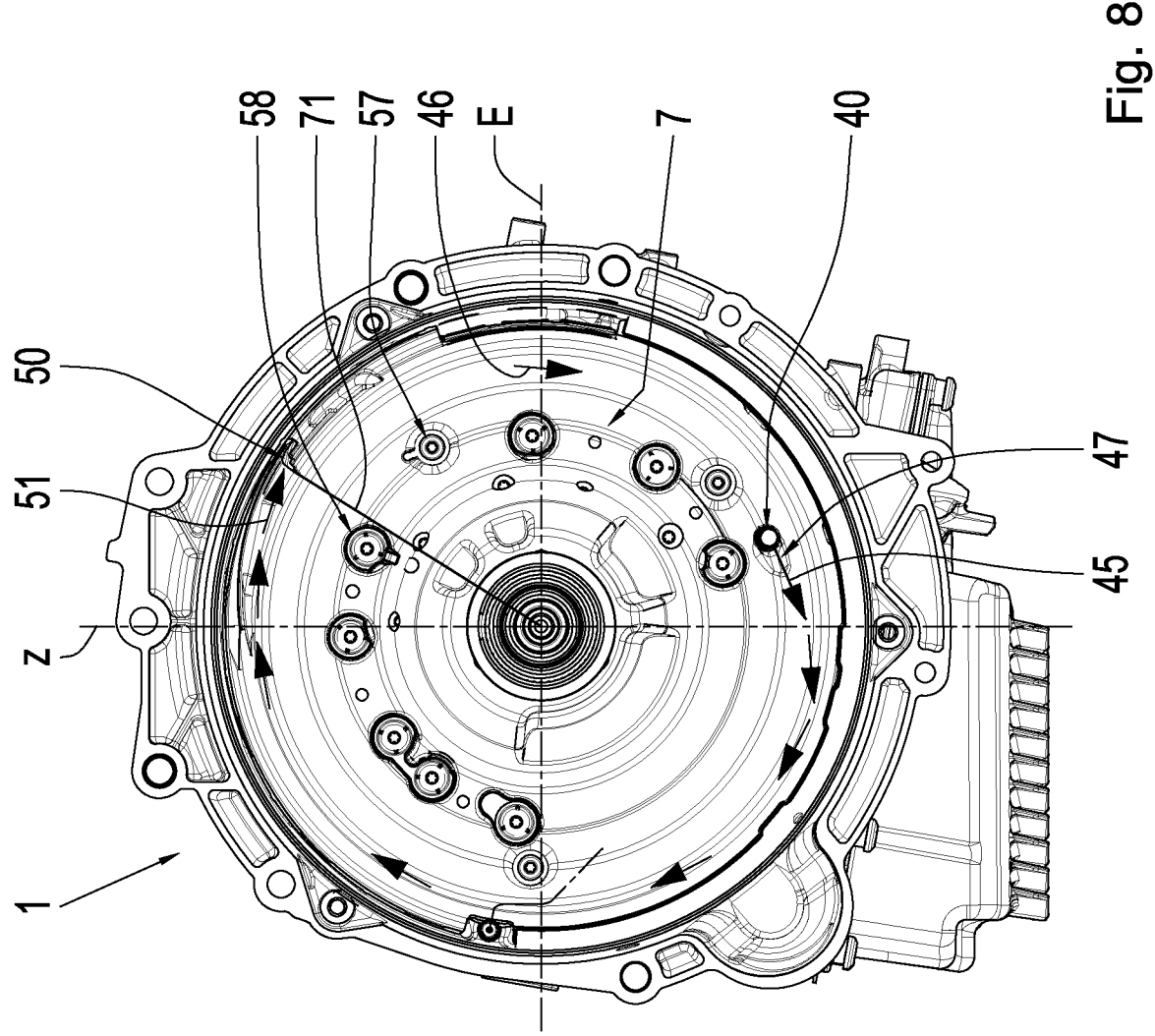
FIG. 8 shows a side view into the opened transmission housing from FIG. 2 onto an oil guide shell.
Figure 9:
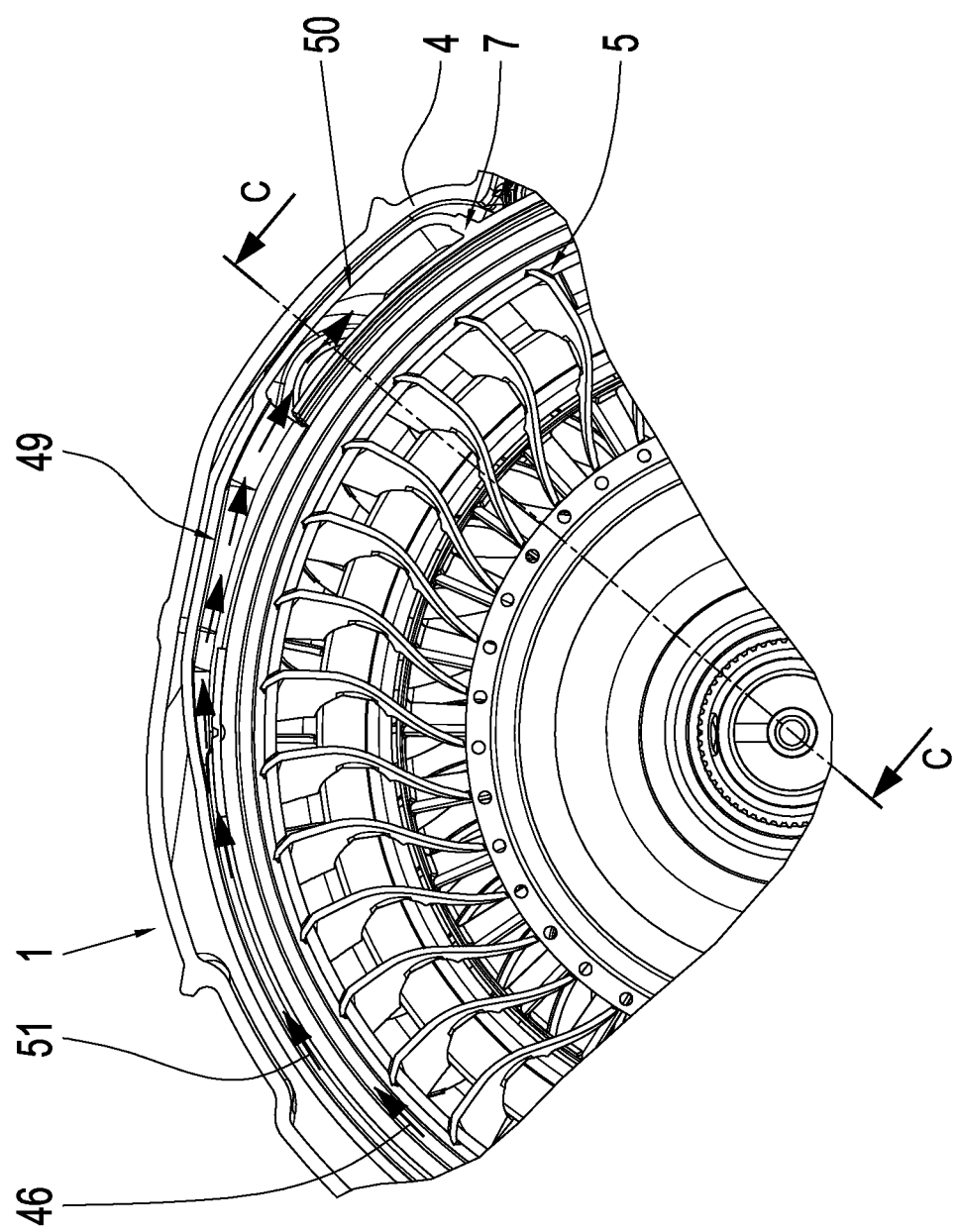
FIG. 9 shows a cross-sectional representation of the oil guide shell according to the sectional view Q1-Q1 in FIG. 7.

The hydrodynamic torque converter 5 generates a vacuum and carries along the oil fed to the hydrodynamic torque converter 5 via an inlet ramp 47 of the oil guide shell 7, the inlet ramp 47 being oriented in a torque converter rotation direction 46, and accelerates the oil radially outward in the direction of rotation of the hydrodynamic torque converter 5, as a result of which a pump effect arises due to the formation of a vacuum at the inflow opening 40. The oil, which is carried along and accelerated toward the outside through the inlet ramp 47 of the rotating torque converter 5, is illustrated in FIG. 3 by a flow arrow 48. The hydrodynamic torque converter 5 conveys the drawn-in oil in the manner described above to an elevated oil ejection opening 50 in the oil guide shell 7, which is shown in FIGS. 7 through 9. The consolidated amount of cooling oil 45 from the two brakes A, B is carried along by the rotating hydrodynamic torque converter 5 when exiting the inflow opening 40 in the oil guide shell 7 and forced along an inner diameter of the oil guide shell 7 in the direction of rotation 46 of the hydrodynamic torque converter 5, which is illustrated by flow arrows 51.

Relative to the above-described time-of-day representation, the oil at approximately one (1) o'clock is then conveyed to the oil ejection opening 50 in the oil guide shell 7 via a drainage ramp 49, which rises radially outward. FIG. 8 shows that the oil ejection opening 50—as viewed from the input side—is arranged at an outer edge of the oil guide shell 7 at approximately one (1) o'clock. The horizontal plane E, the vertical axis z, and the point of origin 31 are plotted once again in FIG. 8 (similarly to FIG. 4). A line 71, which begins in the point of origin 31 and ends at the oil ejection opening 50, forms an angle with the vertical axis z that is in the range of approximately thirty (30°). If this line 71 is compared to an hour hand of a clock, this hour hand would point to approximately one (1) o'clock. The end point of the line 71 is situated in the oil ejection opening 50 and the hour hand points with the end to the oil ejection opening 50. The drainage ramp 49, due to the shape of the drainage ramp 49, which is curved in the direction of the output side 10, deflects the oil in an axial direction (FIG. 7) and guides the oil into a gap 52 between the oil guide shell 7 and the intermediate plate 6 (oil supply system) via the oil ejection opening 50. An oil flow out of the oil ejection opening 50 into the gap 52 is illustrated by a flow arrow 53.

Figure 10:
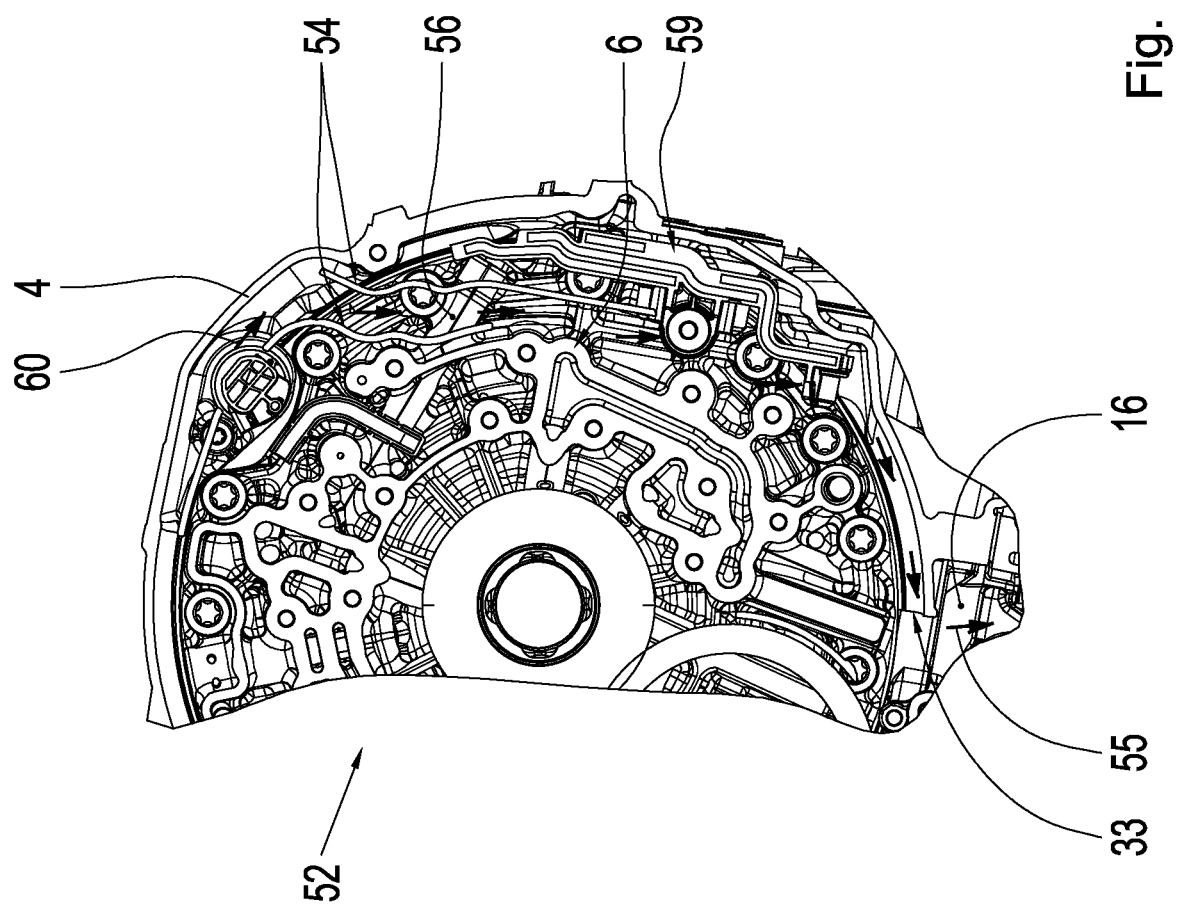
FIG. 10 shows a cross-sectional representation of a gap between the oil guide shell and the intermediate plate according to the sectional view Q2-Q2 in FIG. 7.

An oil flow 60 deflected into the gap 52 via the drainage ramp 49 and the oil ejection opening 50 can be returned in the direction of the tank 8, as illustrated by flow arrows 55, in a targeted manner via oil guide webs 54, which are shown in FIG. 10 and are mounted on the back side of the oil guide shell 7 facing away from the hydrodynamic torque converter 5. The oil guide webs 54 extend such that a flow-stabilized oil return flow area 56 sets in within the gap 52. The oil can then return to the tank 8 via the oil discharge opening 33 in the transmission housing 4 at approximately six (6) o'clock, the oil discharge opening 33 being, for example, cast and punched. FIG. 10 also shows a power terminal 59 of the electric machine 11.

FIG. 8 shows that the oil guide shell 7 rests against an inner area of a hybrid bellhousing of the transmission housing 4 as gaplessly as possible and preferably elastomer sealed in the lower area, as a result of which a sufficient oil tightness against penetration by the oil level from the tank 8 to the torque converter area is achieved. The oil guide shell 7 in the exemplary embodiment shown has been made of plastic in an injection molding process. The oil guide shell 7 is attached directly onto the intermediate plate 6 of the oil supply system for conjoint rotation via three bolts 57 in connection with preferably three bolting bushes made of metal. FIG. 8 also shows openings 58 in the oil guide shell 7 for creating an access to bolt heads in the intermediate plate 6 (oil supply system).

Figure 11:
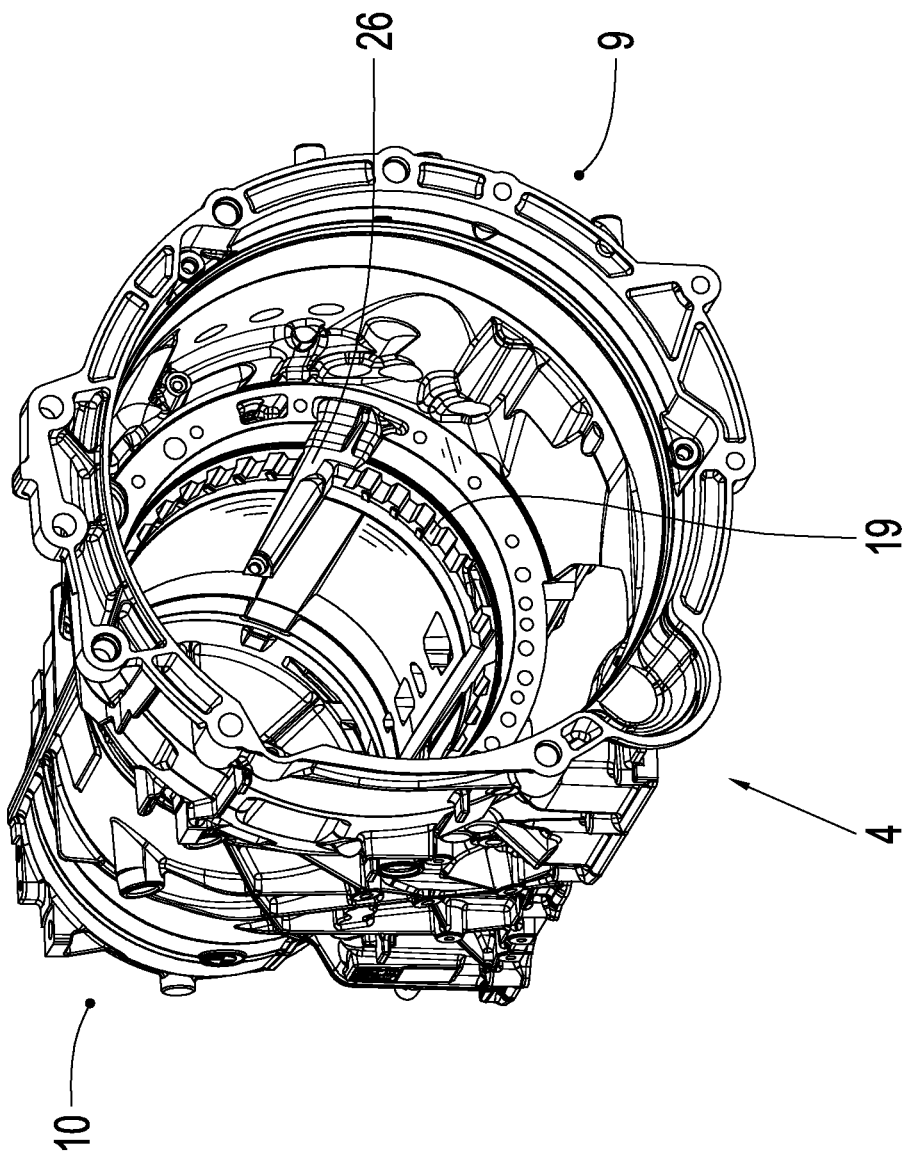
FIG. 11 shows a perspective view into the transmission housing of the automatic transmission from FIG. 2.
Figure 12:
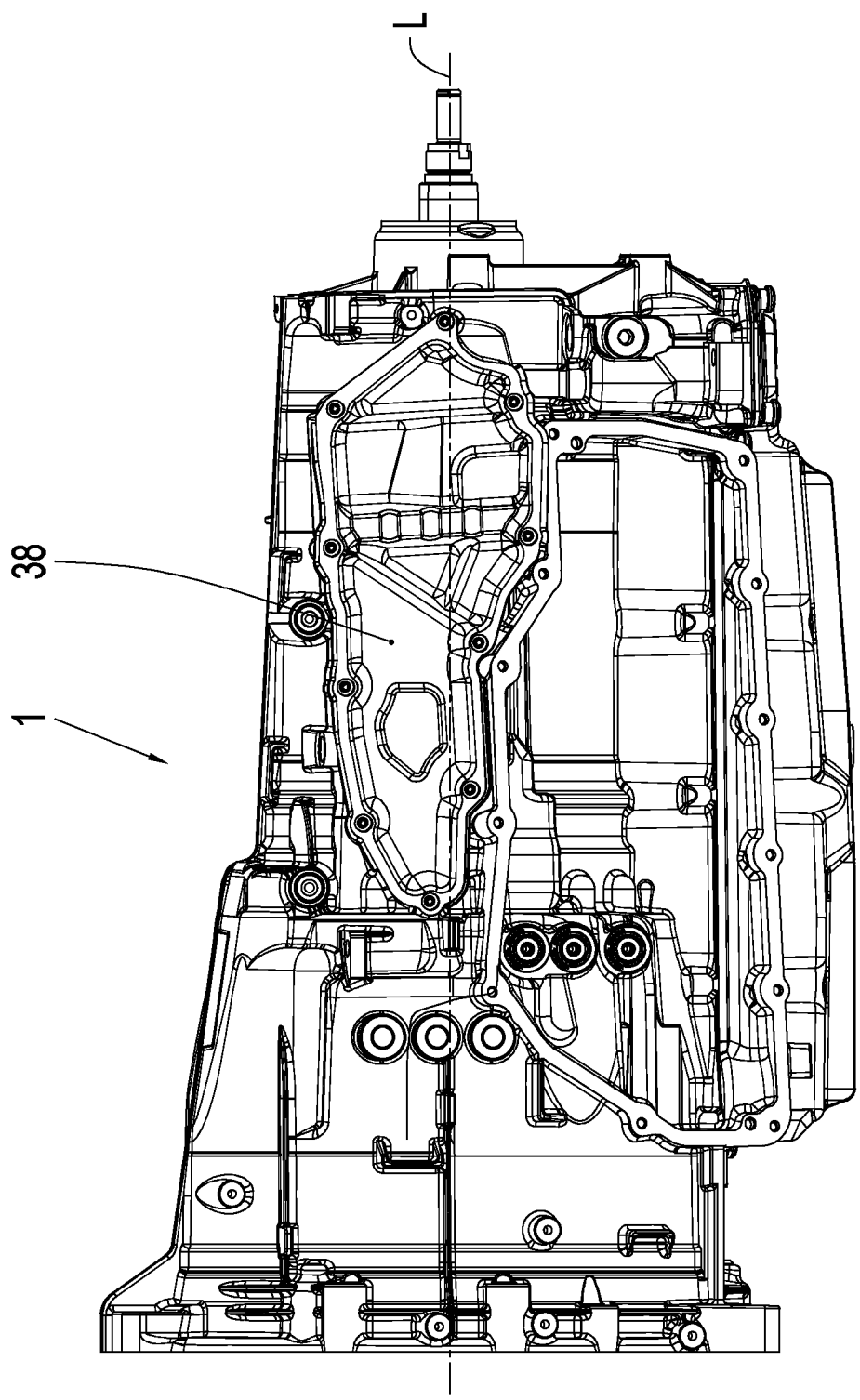
FIG. 12 shows a lateral longitudinal view of the automatic transmission that includes an oil level compensating cavity.

FIG. 11 shows that the oil drainage channel 26 for oil from the second brake B can be axially extended in the direction of the output side in the transmission housing 4, the oil drainage channel 26 being positioned at approximately four (4) o'clock and designed, more particularly, as a cast duct. According to FIGS. 13 through 17, an oil tube 36, which is preferably made of plastic, can be introduced into the cast duct 26. Via the oil tube 36, an oil level compensating cavity 38 can be automatically filled and also appropriately drained and, in fact, via an oil level rising in the gap 52 between the oil guide shell 7 and the intermediate plate 6. For this purpose, the oil level compensating cavity 38 (also referred to as an oil bunker or a bunker) is mounted on the outer side of the transmission housing 4 at the level of the transmission central axis L (FIG. 12). An oil volume can be temporarily stored within the oil level compensating cavity 38. Due to this intermediate storage, a level within the tank 8 can be automatically regulated and adapted according to the temperature, the air proportion, the oil quantity tolerance, driving modes (dynamics, travel uphill and downhill), the gear selection, and the transmission speed.

Due to the intermediate storage in the oil level compensating cavity 38, it can be ensured that rotating parts of the automatic transmission 1 do not become immersed in the oil level. The oil tube 36 connects the oil level compensating cavity 38 to the gap 52 between the oil guide shell 7 and the intermediate plate 6 such that oil can flow from the gap 52 into the oil level compensating cavity 38 when an oil level within the gap 52 reaches an input-side opening of the oil tube 36. Conversely, the oil can also drain out of the oil level compensating cavity 38 via the oil tube 36 back into the gap 52 and, from there, enter the tank 8. A corresponding oil flow in both directions is illustrated with a double arrow 62 in the oiling and de-oiling duct 37 formed by the oil tube.

Figure 13:
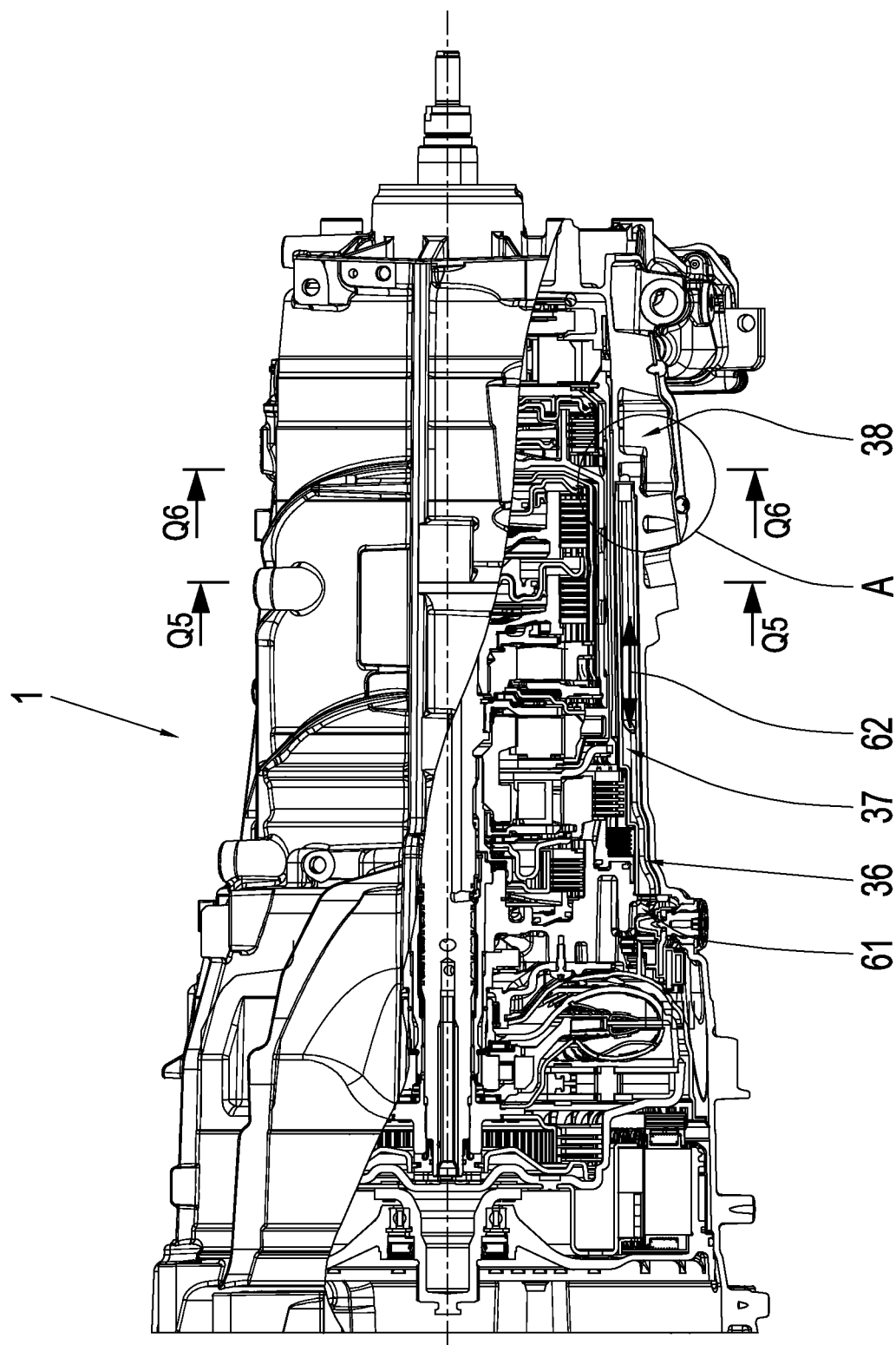
FIG. 13 shows a longitudinal sectional representation of the automatic transmission that includes an oiling and de-oiling duct leading to the oil level compensating cavity from FIG. 12.
Figure 16:
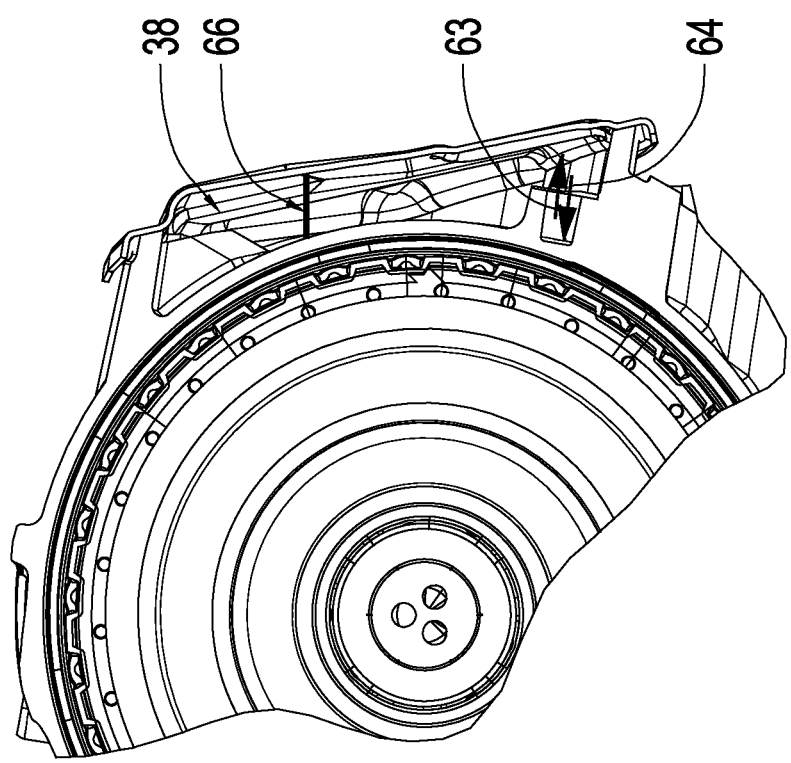
FIG. 16 shows a cross-sectional representation of the automatic transmission according to the sectional view Q6-Q6 in FIG. 13.

FIG. 13 shows an area 61 in which the oil level in the gap 52 rises. FIGS. 14 and 16 show, more particularly, an oil flow 63 into the oil level compensating cavity 38 and an oil flow 64 back out of the oil level compensating cavity 38 into the gap 52. FIG. 14 also shows a mounting interface 65 of the oil tube 36 in the transmission housing 4. FIGS. 15 and 16 show two possible oil levels 66 in the oil level compensating cavity 38 and a sealing cover 67 of the oil level compensating cavity 38.

Figure 17:
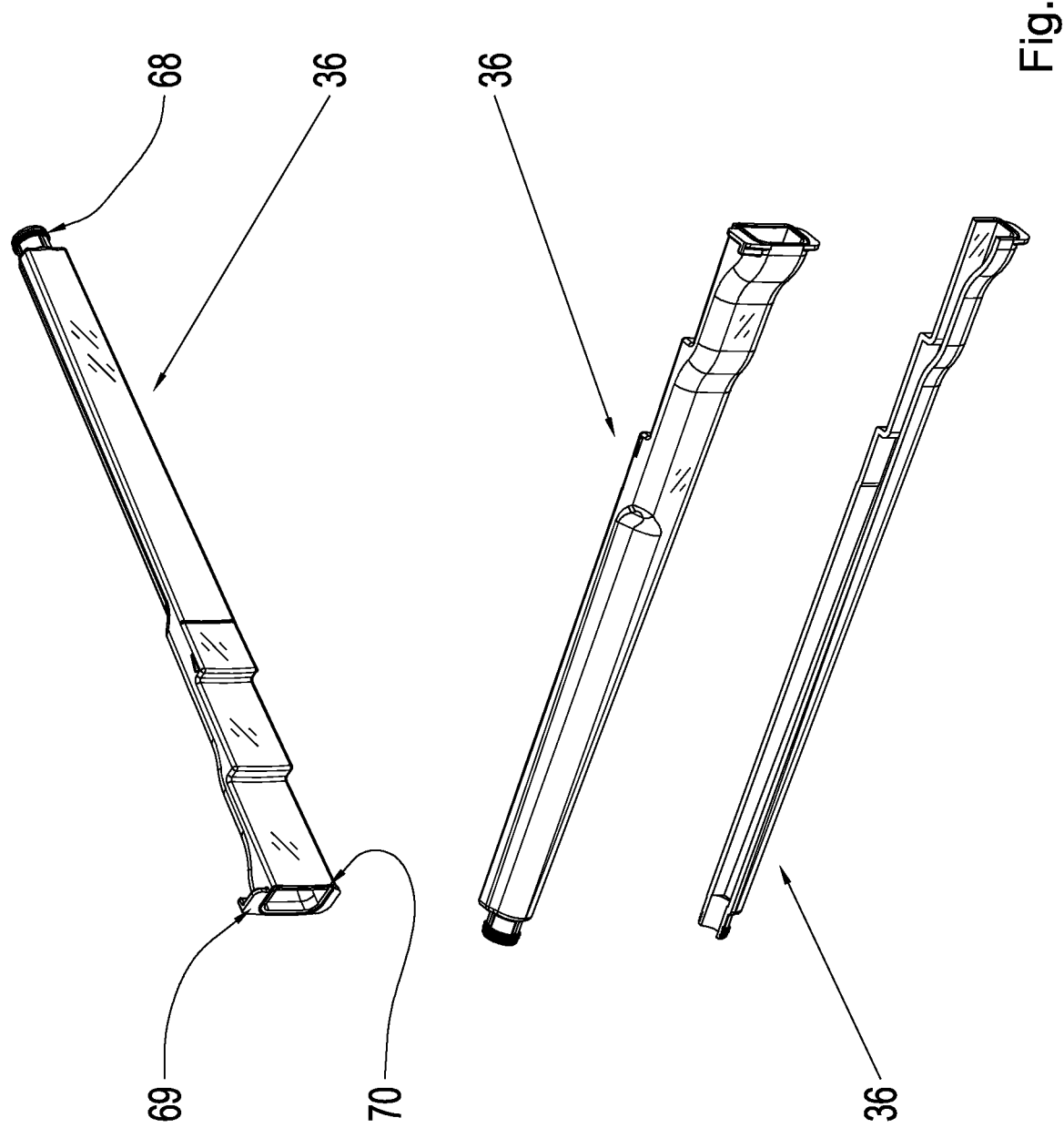
FIG. 17 shows three different views of an oil tube for the oiling and de-oiling duct from FIG. 13.

FIG. 17 shows that the oil tube 36 is designed at an output-side end having a neck 68 with external ring-shaped sealing lips in order to enable a gapless and sealed mounting interface 65 of the oil tube 36 (shown in FIG. 14) in the transmission housing 4. As a result, in the mounted condition, a sufficient leak tightness with respect to the correlating bore in the transmission housing 4 can be ensured, in order to enable a leakage-free filling and draining of the oil level compensating cavity 38. On the opposite, input-side end, the oil tube 36 has a positioning tab 69 in connection with a milled shoulder. As a result, axial guidance in the transmission housing 4 is possible between a transmission housing shoulder and an oil supply system bolt connection surface. In the area of the input-side positioning tab 69, a circumferential and axially protruding sealing lip 70 is introduced at an input-side end face of the oil tube 38. The sealing lip 70 is compressed axially towards a bolt connection surface of the intermediate plate 6 (oil supply system) and, as a result, enables a sufficient seal of the internal oiling and de-oiling duct 37 in the oil tube 36. The force due to the axial compression of this sealing lip 70 can be supported with respect to the transmission housing shoulder via the positioning tab 69 over a short distance.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

A first brake
B second brake
E horizontal plane
L longitudinal axis of input shaft
r radial direction
x axial direction
z vertical axis
1 automatic transmission
2 motor vehicle
3 prime mover
4 transmission housing
5 hydrodynamic torque converter
6 intermediate plate (oil supply system)
7 oil guide shell
8 tank (oil pan)
9 input side
10 output side
11 electric machine
12 stator carrier
13 stator
14 rotor
15 hybrid space
16 oil sump area
17 centering plate
18 input shaft
19 driving spline for the second brake
20 piston of the second brake
21 driving spline for the first brake
22 piston of the first brake
23 pump drive gear
24 oil discharge opening
25 outer clutch disks of second brake
26 oil drainage channel
27 oil-scraping edge
28 radial flow through outer clutch disks of the second brake
29 oil flow in the main rotation direction of the second brake
30 oil flow over oil-scraping edge through oil drainage channel towards intermediate plate
31 point of origin
32 line to the oil drainage channel with oil-scraping edge
33 oil discharge opening
34 oil-scraping edge
35 hydraulic control unit
36 oil tube
37 oiling and de-oiling duct
38 oil level compensating cavity
39.1 first oil duct section
39.2 second oil duct section
39.3 third oil duct section
40 inflow opening in the oil guide shell
41 second oil flow from the second brake
42 first oil flow from the first brake
43 disk pack of the first brake
44 consolidation point
45 consolidated third oil flow
46 torque converter rotation direction
47 inlet ramp
48 oil carried along by inlet ramp
49 drainage ramp
50 oil ejection opening
51 oil flow forced along oil guide shell due to torque converter rotation
52 gap between oil guide shell and intermediate plate
53 oil flow out of the oil ejection opening into the gap
54 oil guide webs
55 oil return flow from the two brakes into the tank
56 flow-stabilized oil return flow area
57 bolts
58 openings
59 power terminal of the electric machine
60 oil flow out of the oil ejection opening
61 area of rising oil level
62 oil flow into and out of the oil level compensating cavity
63 oil flow into the oil level compensating cavity
64 oil flow out of the oil level compensating cavity
65 oil tube mounting interface
66 oil level
67 sealing cover
68 neck with sealing lips
69 positioning tab
70 sealing lip
71 line to the oil ejection opening

The invention claimed is:

1. An automatic transmission (1) for a motor vehicle (2), comprising:

a transmission housing (4);
a hydrodynamic torque converter (5);
a first brake (A);
a second brake (B);
an intermediate plate (6) fixedly connected to the transmission housing (4), the intermediate plate (6) comprising ducts for supplying the hydrodynamic torque converter (5) and the first and second brakes (A, B) with oil;
an oil guide shell (7) arranged between the hydrodynamic torque converter (5) and the intermediate plate (6); and
a tank (8),
wherein the oil guide shell (7) comprises an inflow opening (40) arranged above the tank (8) and an oil ejection opening (50) arranged above the inflow opening (40),
wherein the automatic transmission (1) is configured such that the oil coming from the two brakes (A, B) sinks via oil ducts (26; 39.1, 39.2, 39.3) in the transmission housing (4) and the intermediate plate (6) and reaches the hydrodynamic torque converter (5) via the inflow opening (40) in the oil guide shell (7), and
wherein the hydrodynamic torque converter (5) is configured such that rotation of the hydrodynamic torque converter (5) conveys the oil to the oil ejection opening (50) in the oil guide shell (7), from where the oil sinks into the tank (8) via a gap (52) delimited by the oil guide shell (7) and the intermediate plate (6).

2. The automatic transmission (1) of claim 1, wherein, in a time-of-day representation:
the inflow opening (40) in the oil guide shell (7) is arranged at 5 o'clock; and
the oil ejection opening (50) in the oil guide shell (7) is arranged at 1 o'clock.

3. The automatic transmission (1) of claim 1, wherein:
the oil guide shell (7) comprises a drainage ramp (49) proximate the oil ejection opening (50);
the drainage ramp (49) rises outwardly in a radial direction (r) up to the oil ejection opening (50); and
the discharge ramp (49) is curved towards an output side (10) of the automatic transmission (1) such that the oil conveyed from the hydrodynamic torque converter (5) towards the oil ejection opening (50) is deflected via the discharge ramp (49) to the oil ejection opening (50) and, thereafter, into the gap (52) between the oil guide shell (7) and the intermediate plate (6).

4. The automatic transmission (1) of claim 3, wherein:
the oil guide shell (7) comprises oil guide webs (54);
the oil guide webs (54) project from a surface of the oil guide shell (7) that faces the output side (10); and
the oil guide webs (54) are configured to deflect the oil that enters the gap (52) between the oil guide shell (7) and the intermediate plate (6) via the oil ejection opening (50) towards an oil discharge opening (33) in a lower area of the automatic transmission (1) such that the oil is drainable into the tank (8) via the oil discharge opening (33).

5. The automatic transmission (1) of claim 1, wherein:
the transmission housing (4) forms a driving spline (19) for the second brake (B);
the oil duct in the transmission housing (4) comprises an oil drainage channel (26) with an oil-scraping edge (27), the oil drainage channel (26) arranged proximate the driving spline (19) for the second brake (B);
the second brake (B) is configured such that the oil coming from the second brake (B) is conveyed along the driving spline (19) in a direction of rotation (29) of the second brake (B) when the second brake (B) is disengaged and rotates; and
the second brake (B) is configured such that the oil conveyed from the second brake (B) along the driving spline (19) is deflected from the oil-scraping edge (27) of the oil drainage channel (26) into the oil duct (39.2, 39.3) of the intermediate plate (6).

6. The automatic transmission (1) of claim 5, wherein:
the transmission housing (4) forms the oil discharge opening (33),
the oil discharge opening (33) is arranged proximate the driving spline (19) for the second brake (B) underneath the oil drainage channel (26); and
the oil coming from the second brake (B) is drainable into the tank (8) via the oil discharge opening (33).

7. The automatic transmission (1) of claim 6, wherein a through-flow surface of the lower oil discharge opening (33) is selected such that an amount of the oil flowable into the second brake (B) due to an oil level rising from below is less than a maximum amount of oil drainable via the oil drainage channel (26).

8. The automatic transmission (1) of claim 1, wherein:
the intermediate plate (6) forms a first oil duct section (39.1) for the oil coming from the first brake (A);
the intermediate plate (6) forms a second oil duct section (39.2) for the oil coming from the second brake (B), the second oil duct section (39.2) connected to the oil duct (26) in the transmission housing (4); and
the first oil duct section (39.1) and the second oil duct section (39.2) are combined into a common third oil duct section (39.3) that is connected to the inflow opening (40) in the oil guide shell (7).

9. The automatic transmission (1) of claim 8, wherein:
the first oil duct section is configured as an oblique bore (39.1) in a lower area of the intermediate plate (6); and
the oblique bore (39.1) extends between a cast driving spline (21) for outer clutch disks (43) of the first brake (A) and the third oil duct section (39.3) and extends from outwardly in a radial direction (r).

10. The automatic transmission (1) of claim 1, wherein:
the oil guide shell (7) comprises an inlet ramp (47); and
the inlet ramp (47) is slanted in a direction of rotation (46) of the hydrodynamic torque converter (5) such that the oil is drawn in from the inflow opening (40) in the oil guide shell (7) by the inlet ramp (47) when the hydrodynamic torque converter (5) is rotating, accelerated radially outward in the direction of rotation (46) of the hydrodynamic torque converter (5), and conveyed to the oil ejection opening (50) in the oil guide shell (7).

11. The automatic transmission (1) of claim 1, wherein:
the automatic transmission (1) comprises an oil level compensating cavity (38) arranged on an outside of the transmission housing (4) at a level of the transmission central axis (L);
the drainage channel is configured as a cast duct (26) in the transmission housing (4);
the cast duct (26) extends axially in the direction of an output side (10) of the automatic transmission (1) and up to the oil level compensating cavity (38); and
an oil tube (36) is arranged in the cast duct (26), the oil tube (36) connecting the oil level compensating cavity (38) to the gap (52) between the oil guide shell (7) and the intermediate plate (6) such that the oil can is flowable from the gap (52) into the oil level compensating cavity (38) when an oil level within the gap (52) reaches an input-side opening of the oil tube (36).

\* \* \* \* \*